United States Patent [19]
Gillbrand et al.

[11] Patent Number: 5,611,301
[45] Date of Patent: Mar. 18, 1997

[54] STRUCTURAL ENCLOSURE OF COMBUSTION ENGINES FOR THE PURPOSE OF REDUCING ENGINE NOISE

[75] Inventors: Per Gillbrand, Mariefred; Lars Bergsten, Järna, both of Sweden

[73] Assignee: Saab Automobile Aktiebolag, Sweden

[21] Appl. No.: 556,918

[22] PCT Filed: May 26, 1994

[86] PCT No.: PCT/SE94/00497

§ 371 Date: Nov. 20, 1995

§ 102(e) Date: Nov. 20, 1995

[87] PCT Pub. No.: WO94/28345

PCT Pub. Date: Dec. 8, 1994

[30] Foreign Application Priority Data

May 28, 1993 [SE] Sweden ................................. 9301814

[51] Int. Cl.⁶ .................................................. F02B 23/00
[52] U.S. Cl. .................. 123/48 C; 123/78 C; 123/195 R
[58] Field of Search ........................... 123/195 R, 198 E, 123/78 C, 48 C

[56] References Cited

U.S. PATENT DOCUMENTS

| | | | |
|---|---|---|---|
| 1,792,201 | 2/1931 | Treiber | 123/48 C |
| 4,174,683 | 11/1979 | Vivian | 123/78 C |
| 4,869,217 | 9/1989 | Kastlunger | 123/193.3 |
| 4,873,947 | 10/1989 | Ryan, III et al. | 123/78 C |
| 5,016,584 | 5/1991 | Inoue et al. | 123/195 R |
| 5,404,847 | 4/1995 | Han | 123/195 R |

FOREIGN PATENT DOCUMENTS

| | | | |
|---|---|---|---|
| 12411 | 3/1928 | Australia | 123/78 C |
| 0056347 | 7/1982 | European Pat. Off. | |
| 0227383 | 7/1987 | European Pat. Off. | |
| 299222 | 10/1928 | United Kingdom | 123/78 C |

*Primary Examiner*—David A. Okonsky
*Attorney, Agent, or Firm*—Ostrolenk, Faber, Gerb & Soffen, LLP

[57] ABSTRACT

The invention relates to an engine with a constructional design and material composition for optimum thermal conductivity and vibration damping functions. The invention consists in the cylinder section (11) surrounding the combustion chamber being made of a light metal alloy and in the lower part of the cylinder section being connected to a crankcase section (13) with integral lateral walls (21,22) which enclose the cylinder section (11) with an air gap, and the crankcase section is made of a material with higher density than the cylinder section, preferably cast iron.

16 Claims, 3 Drawing Sheets

STRUCTURAL ENCLOSURE OF COMBUSTION ENGINES FOR THE PURPOSE OF REDUCING ENGINE NOISE

This invention relates to a combustion engine including a cylinder section disposed in a crankcase section, wherein the crank case section has a lateral wall spaced at an air gap from the cylinder section and particularly relates to a selection of materials for the engine to enhance thermal conductivity while damping vibration and noise.

STATE OF THE ART

In engine technology it is known, of prior art, for different parts of combustion engines to be made of different materials. One well-proven choice of material has been cast iron for the cylinder section, crankshaft section and cylinder head of combustion engines. The increasing importance attached to weight has motivated increasing use of aluminium despite the latter being a more expensive construction material. Aluminium has been used in engines for the cylinder head only, for the cylinder head and cylinder section and for the whole engine. Aluminium has the advantage of its thermal conductivity being significantly better than that of cast iron, whereas east iron provides significantly greater internal damping of vibration and noise.

OBJECT OF THE INVENTION

The object of this invention is to achieve an engine in which the greatest possible advantage is taken of the damping capacity of east iron while at the same time achieving high thermal conductivity in the immediate vicinity of the combustion chamber. A further object is to achieve, by correct constractional design of the engine unit, a filtering out of transmitted vibration in a transition zone between different materials with different vibration-conducting characteristics. Another object is to provide around a combustion engine mainly surrounded by aluminium a secondary screen of east iron, with an intermediate air space, for increased damping of noise emitted by the combustion engine. Another object is, in connection with the manufacture of a combustion engine with variable compression, to adapt the choice of materials for different parts of the engine so as to achieve the most advantageous material composition from the vibration point of view.

According to the invention, this object is achieved by engine design wherein the cylinder section includes the combustion chamber and the cylinder head is disposed over the combustion chamber. The cylinder section is comprised of a light metal alloy, preferably aluminum alloy, while the crankcase section is made of a material of a density which exceeds that of the cylinder section, by a factor of at least 2.6, e.g. cast iron. The cylinder section has a lower portion away from the cylinder head at which the cylinder section is secured to the crankcase section in a manner permitting relative tilting between them e.g. by a tilt shaft connection between them.

Further features and advantages characterising the invention are indicated in the following description of an advantageous embodiment.

LIST OF FIGURES

The description is given with reference to the attached drawings, in which

DESCRIPTION OF THE EMBODIMENT

Figure 1:
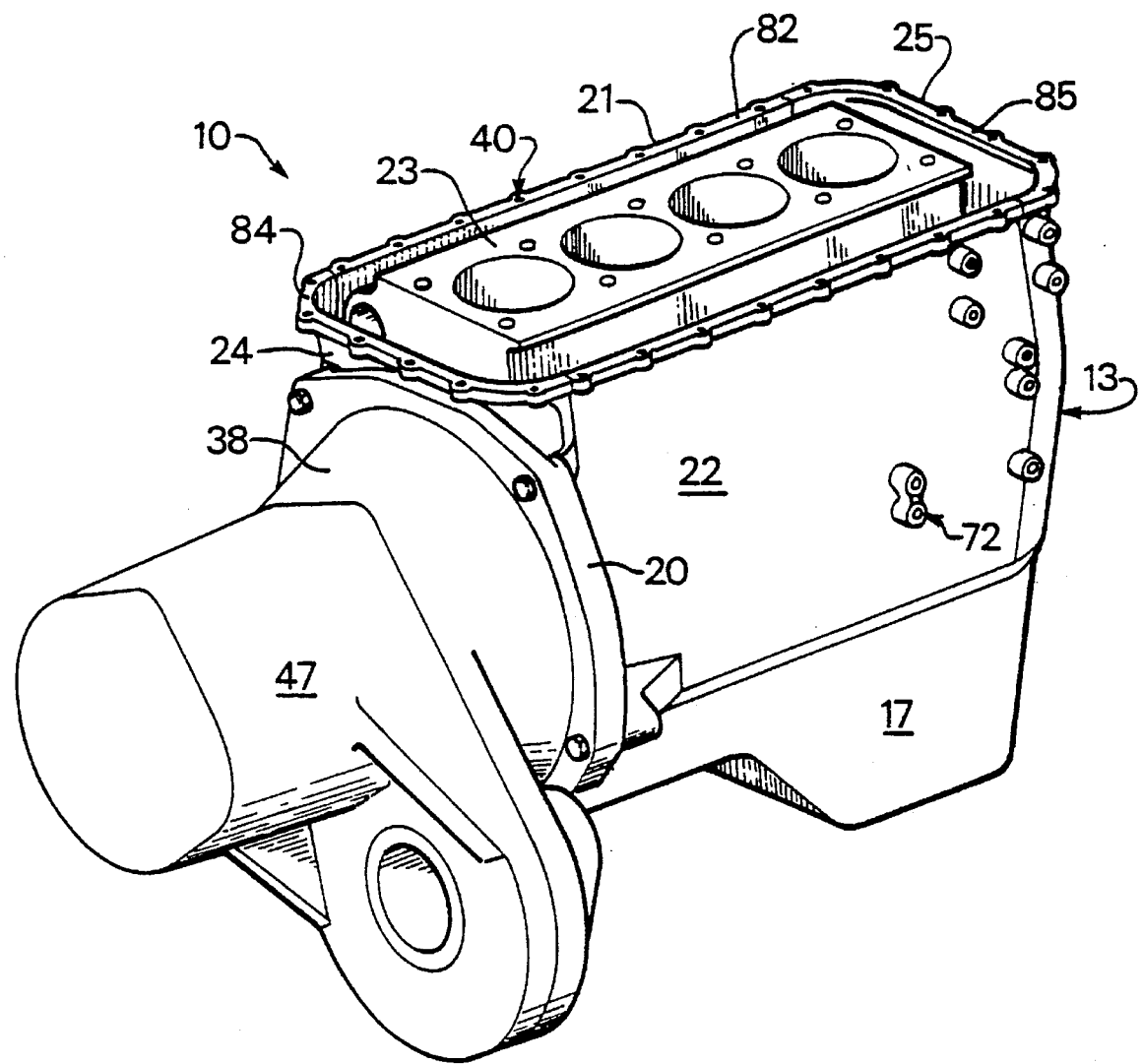
FIG. 1 shows a perspective view of the engine.
Figure 2:
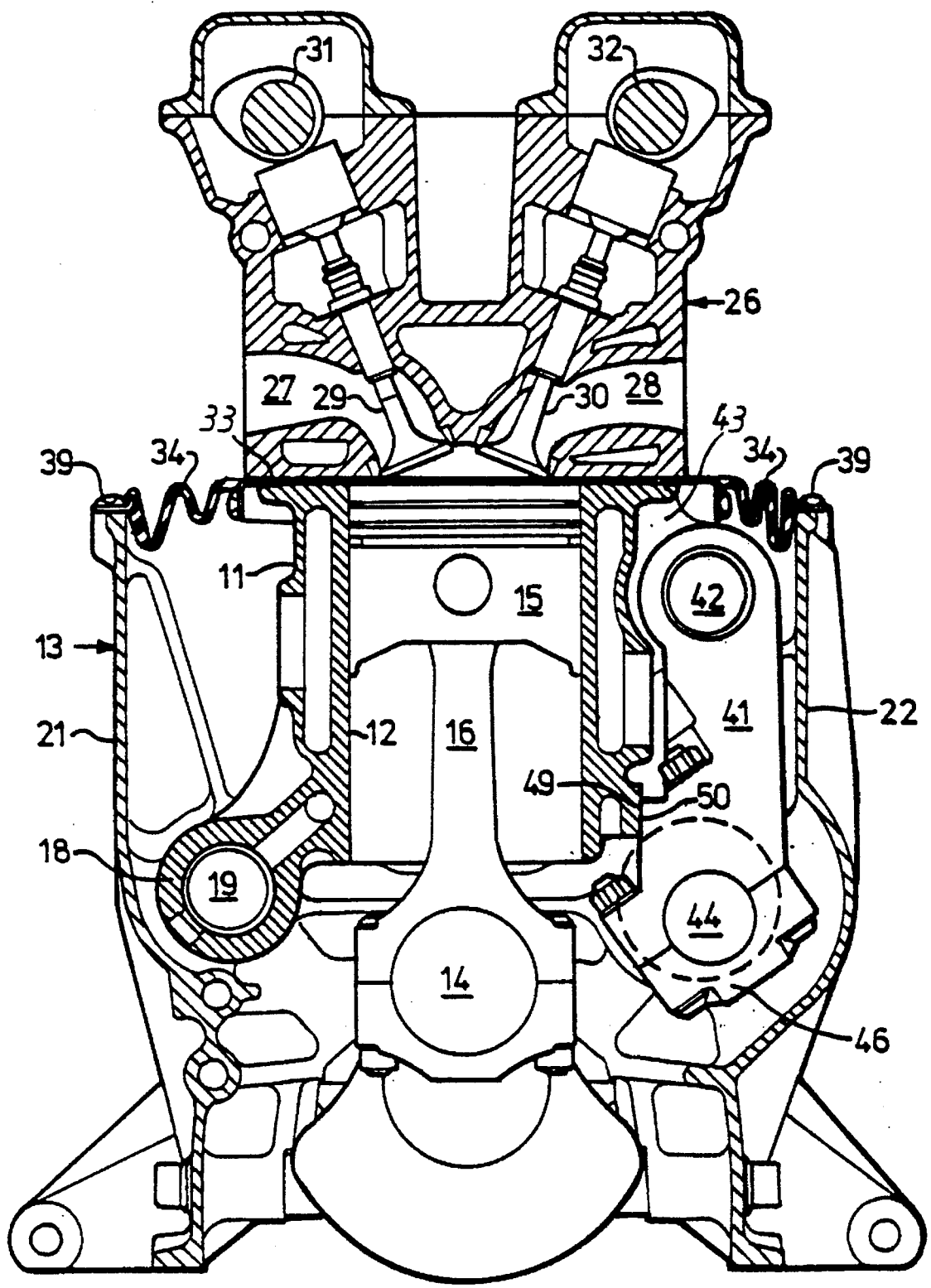
FIG. 2 shows a vertical cross-sectional view of the engine in a position for maximum compression.

The embodiment is described with reference to a multiple cylinder combustion engine of the Otto type, intended for use in a vehicle such as a passenger car. The attached FIG. 1 shows in perspective the basic construction of the engine 10, in which a number of components have been omitted to improve the clarify of the figure. FIG. 2 shows the engine 10 in cross-section, with the cylinder head fitted, but does not show the complete engine.

The engine 10 incorporates a cylinder section 11, in this case with four cylinders 12 arranged in line and each cylinder including a combustion chamber. The engine 10 also includes a crankcase section 13 housing the crankshaft 14 of the engine 10 and the crankshaft bearings. Each cylinder 12 houses a piston 15 which is connected by a connecting rod 16 to the crankshaft 14. The engine 10 incorporates conventionally an oil sump 17 secured to the underside of the crankcase section 13.

Along one of its sides, on the left side in FIG. 2, the cylinder section 11 is provided at its lower end with four bearing lugs 18, only one of which is shown in FIG. 2, which accommodate a shaft 19 housed in four bearing brackets secured to the crankcase section 13.

This arrangement enables the cylinder section 11 to be tilted about this shaft 19 relative to the crankcase section 13. The fact that the crankshaft 14 and the engine pistons 15 connected to it are mounted in the crankcase section 13, while the distance to the cylinder section 11 can be varied, means that the compression ratio of the engine 10 can also be varied.

FIG. 2 shows the engine 10 in a position where the cylinder section 11 is tilted to a minimum extent about the shaft 19 so that a lower limit position is adopted. In this position the engine 10 exhibits a maximum compression ratio.

The crankcase section 13 is also designed with integral lateral walls 21, 22 rising vertically on both sides of the cylinder section 11. These lateral walls 21, 22 extend vertically to a level which corresponds essentially to the upper end surface 23 of the cylinder section 11. up to at least a plane which is mainly level with a roof which delineates the combustion chamber. At one end of the engine 10, in this case the rear end, is arranged a mountable gear case 24, and at the other front end is arranged a mountable end plate 25, both of which also constitute lateral walls. The end plate 25 and the gear case 24 connect together the two lateral walls 21, 22 secured to the crankcase section. The end plate 25 and the gear case 24 also extend vertically to a level corresponding essentially to the upper end surface 23 of the cylinder section 11. This means that the upper end surfaces 82–85 of the lateral walls 21, 22, the end plate 25 and the gear case 24 will lie in the same plane, which plane also corresponds essentially to the upper end surface 23 of the cylinder section 11. The lateral walls 21, 22, the gear case 24 and the end plate 25 will thus enclose the cylinder section 11 around its periphery. In this embodiment, the upper end surfaces 82–85 of the lateral walls 21, 22, the gear case 24 and the end plate 25 also constitute the upper edges of the respective components. In alternative embodiments it is sufficient for the respective components 21, 22, 24, 25 to be designed with similar surfaces which need not at the same time be edges.

In an alternative embodiment it is possible for the lateral walls 21, 22 to be mountably secured to the crankcase section 13 instead of being integral parts of the latter.

As shown in FIG. 1, the gear case 24 is designed with a flange 20 to which is secured a clutch case 38 housing a clutch connected to the output shaft of the engine 10. A gearbox 47 of conventional design is secured to the clutch case 38. The clutch case 38 and the gearbox 47 also house a final drive which transmits outgoing driving force to the drive shafts (not shown). The drive shafts are arranged to extend parallel with the engine 10 and on both sides of the clutch case 38/gearbox 47, which means that the vehicle has its engine positioned transversely.

A cylinder head 26 with inlet and outlet ducts 27, 28, inlet and outlet valves 29, 30 and two overhead camshafts 31, 32 is secured to the top 23 of the cylinder section 11. The inlet and outlet ducts 27, 28 are connected to normal arrangements (not shown) such as inlet and outlet systems and associated devices for fuel injection, supercharger and exhaust gas cleaning arrangements.

A cylinder head gasket 33 is arranged between the cylinder head 26 and the cylinder section 11 of the engine 10. An elastic seal 34 which extends round the whole cylinder section 11 is arranged between the cylinder section 11 of the engine 10 and the surrounding lateral walls 21, 22, the gear case 24 and the end plate 25. The seal 34 is designed for sealing the crankcase of the engine 10. The seal 34 is advantageously designed with a bellows-shaped cross-sectional shape, which means that it can be moved in its own plane, can be placed at an angle and can provide positions at different heights for different parts of the seal 34. The fact that the cylinder head gasket 33 is almost entirely rigid prevents the elastic seal 34 from being compressed excessively between the cylinder head 26 and the cylinder section 11.

A plate edge which is secured by means of a number of bolted joints 39 so that it seals against the respective upper end surfaces of the lateral walls 21, 22, the end plate 25 and the gear case 24 is cast in at the outer edge of the seal 34. For this purpose the end surfaces are designed with mounting holes 40.

Figure 3:
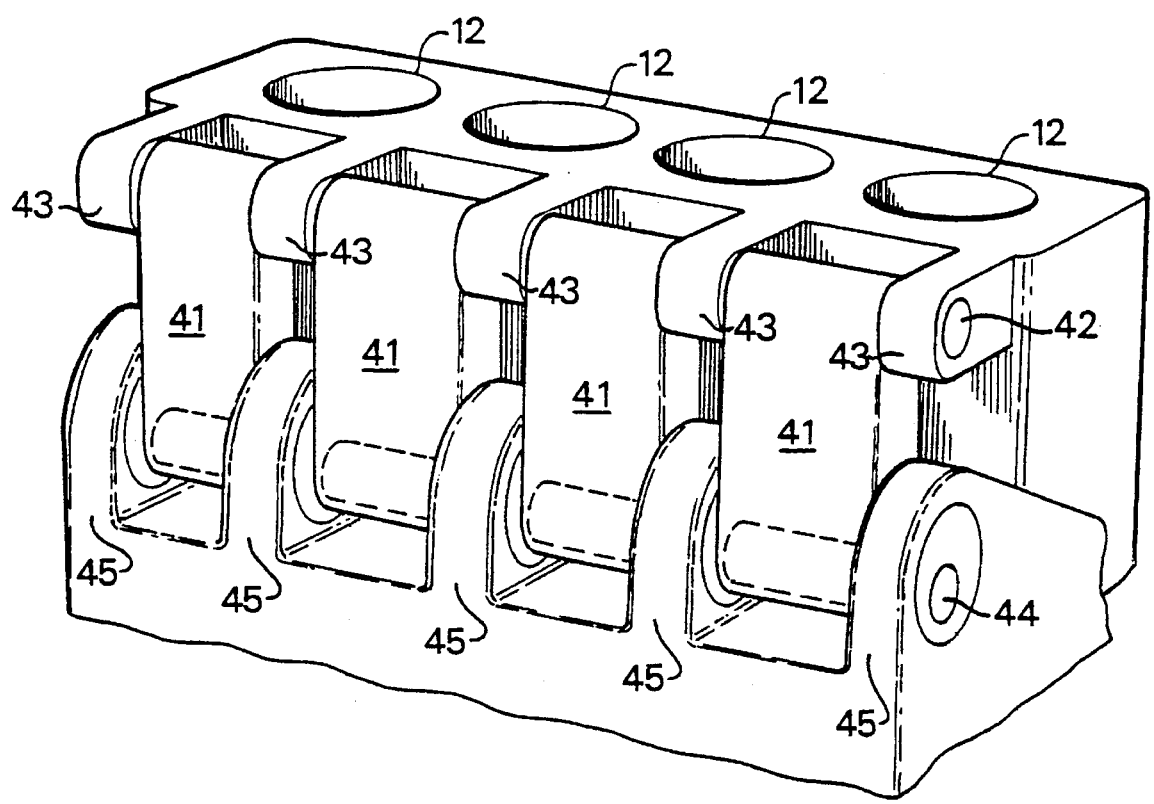
FIG. 3 shows a perspective and detailed view of an arrangement for varying the compression of the engine.

On the bearing shaft 19 on the opposite side of the cylinder 11, the right side in FIG. 2, are arranged four rods 41 resembling connecting rods, which are also shown schematically in FIG. 3. The respective upper ends of the rods 41 are mounted on a longitudinal shaft 42 which is in its turn mounted in five bearing brackets 43 secured to the cylinder section. The respective lower ends of the rods 41 are mounted eccentrically on an eccentric shaft 44 which is housed in five bearing brackets 45 secured to the crankcase section. The five bearing brackets 43 secured to the cylinder section are respectively arranged at the ends of the cylinder section 11 and in the area between the cylinders 12 where the cylinder section 11 has a relatively high degree of rigidity.

The lower ends of the rods 41 are designed with separate bearing caps 46, which makes them easy to fit to and remove from the eccentric shaft 44. To the front end of the eccentric shaft 44 is secured a suitable arrangement (not shown) whereby the eccentric shaft 44 can be rotated. The eccentric shaft 44 can be rotated a maximum of approximately half a revolution, corresponding to the maximum stroke of the rods 41 and also to the range within which the compression of the engine 10 can be varied. The rods 41 interact with stops 49 provided on the side of the cylinder section 11 so that lateral faces 50 on the respective rods 41 come to rest against the stops 49 in both limit positions of the eccentric shaft 44. Arranging such a dimensionally stable limitation of the rotation of the eccentric shaft 44 means that the latter can be positioned close to the cylinder section 11 in the lateral direction. This makes it possible for the engine 10 to be of compact design.

The cylinder section 11 is made of some light metal alloy, preferably an aluminium cast alloy, which means that the weight of the cylinder section can be kept down and the combustion chamber can be provided with an inner enclosure which exhibits very good thermal conductivity and heat distribution. The crankcase section 13 is made of cast iron which has a density of approximately 7.2–7.7 kg/dm$^3$, which exceeds the conventional cast aluminium alloy density of approximately 2.7 kg/dm$^3$ by a factor of nearly 3 and in any case over 2.6. The different characteristics of the materials also provide the components with different acoustic resistances, and all noise propagated in the cylinder section 11 is subjected to variation in noise resistance at the transition via the bearing shaft 19 and the rods 41 and their shafts 42, 44 to the crankcase section 13. This variation in noise resistance results in a reduction in noise propagation. At each transition between layers of different materials, there is a change of state which causes damping and reflection of the vibrations being propagated.

The webs 21, 22 and the end plates 24, 25 are preferably made of cast iron, thereby creating a noise screen with high material density to enclose the cylinder section. The reduction which takes place between the cylinder section and the crankcase section in the primary noise conducted from the combustion chamber is highly advantageous in view of the primary noise which may be propagated in the vehicle structure if at the time of assembling the vehicle the crankcase section of the combustion engine is fitted to the structural beams of the vehicle via damping arrangements.

The piston is also preferably made of aluminium. This means that noise from the combustion chamber is picked up first by the light metal components of the engine before it can reach the vehicle body structure via a transition to the cast iron of the crankcase section.

The fact that the unique material combination of the invention with a crankcase section which preferably surrounds the cylinder section and is made of a material with a high material density relative to the material of the cylinder section and accordingly the material of the cylinder section forming the combustion chamber has relatively low material density but good thermal conductivity means even heat distribution and good cooling characteristics for the parts of the engine most subjected to heat. This also means that a more rigid material can be used for the crankcase section, which is advantageous because of the crankcase section being subjected to powerful forces.

We claim:

1. A combustion engine comprising:

a cylinder section shaped to define combustion engine cylinders with combustion chambers in the cylinders; the cylinder section including an upper end; the cylinder section being comprised of a light metal alloy;

a cylinder head generally at the upper end of the cylinder section;

a crankcase section including lateral walls surrounding the cylinder section, the lateral walls being spaced from the cylinder section to define an intermediate air gap between the cylinder section and the lateral walls of the crankcase section, the lateral walls of the crankcase section extending up toward the cylinder head; the crankcase section being made of a material of a density which exceeds the density of the material of the cylinder section by a factor of at least 2.6;

the cylinder section having a lower portion away from the cylinder head, and means securing the lower portion of the cylinder section to the crankcase section.

2. The combustion engine of claim 1, wherein the lateral walls extend to a level essentially corresponding to the upper end of the cylinder section.

3. The combustion engine of claim 1, wherein the lateral walls extend to a level which is at least at a plane which is mainly level with a roof which delineates the combustion chamber.

4. The combustion engine of claim 1, wherein the crankcase section is comprised of cast iron.

5. The combustion of claim 1, further comprising a flexible seal connection between the lateral walls of the crankcase section and the cylinder head.

6. The combustion engine of claim 1, wherein the cylinder section is comprised of an aluminum alloy.

7. The combustion engine of claim 6, wherein the crankcase section is comprised of cast iron.

8. The combustion engine of claim 7, wherein the crankcase section including the lateral walls thereof are made of cast iron.

9. The combustion engine of claim 8, wherein the crankcase section includes other elements in addition to the lateral walls, and the lateral walls are integral with the other elements of the crankcase section.

10. The combustion of claim 9, further comprising a flexible seal connection between the lateral walls of the crankcase section and the cylinder head.

11. The combustion engine of claim 10, wherein the cylinder section is tiltable relative to the crankcase section while surrounded by the walls of the crankcase section.

12. The combustion engine of claim 1, wherein the cylinder section is tiltable relative to the crankcase section while surrounded by the walls of the crankcase section.

13. The combustion engine of claim 1, further comprising means supporting the cylinder section for tilting with reference to the crankcase section while surrounded by the walls of the crankcase section.

14. The combustion engine of claim 13, further comprising a flexible seal connection between the lateral walls of the crankcase section and the cylinder head.

15. The combustion engine of claim 13, wherein the supporting means comprises a tilt shaft connected with the lower portion of the cylinder section away from the combustion chamber, and the shaft extending into the crankcase section enabling the tilting of the cylinder section with reference to the crankcase section around the shaft.

16. The combustion engine of claim 1, wherein the cylinder section comprises a cylinder block with a plurality of cylinders therein for receiving pistons and comprises pistons mounted for being movable in the cylinders and for defining the combustion chambers and being movable with reference to the cylinder head.

* * * * *